Sept. 22, 1936.  S. DE ORLOW  2,054,929
HOOD LATCH
Filed May 6, 1933  2 Sheets-Sheet 1
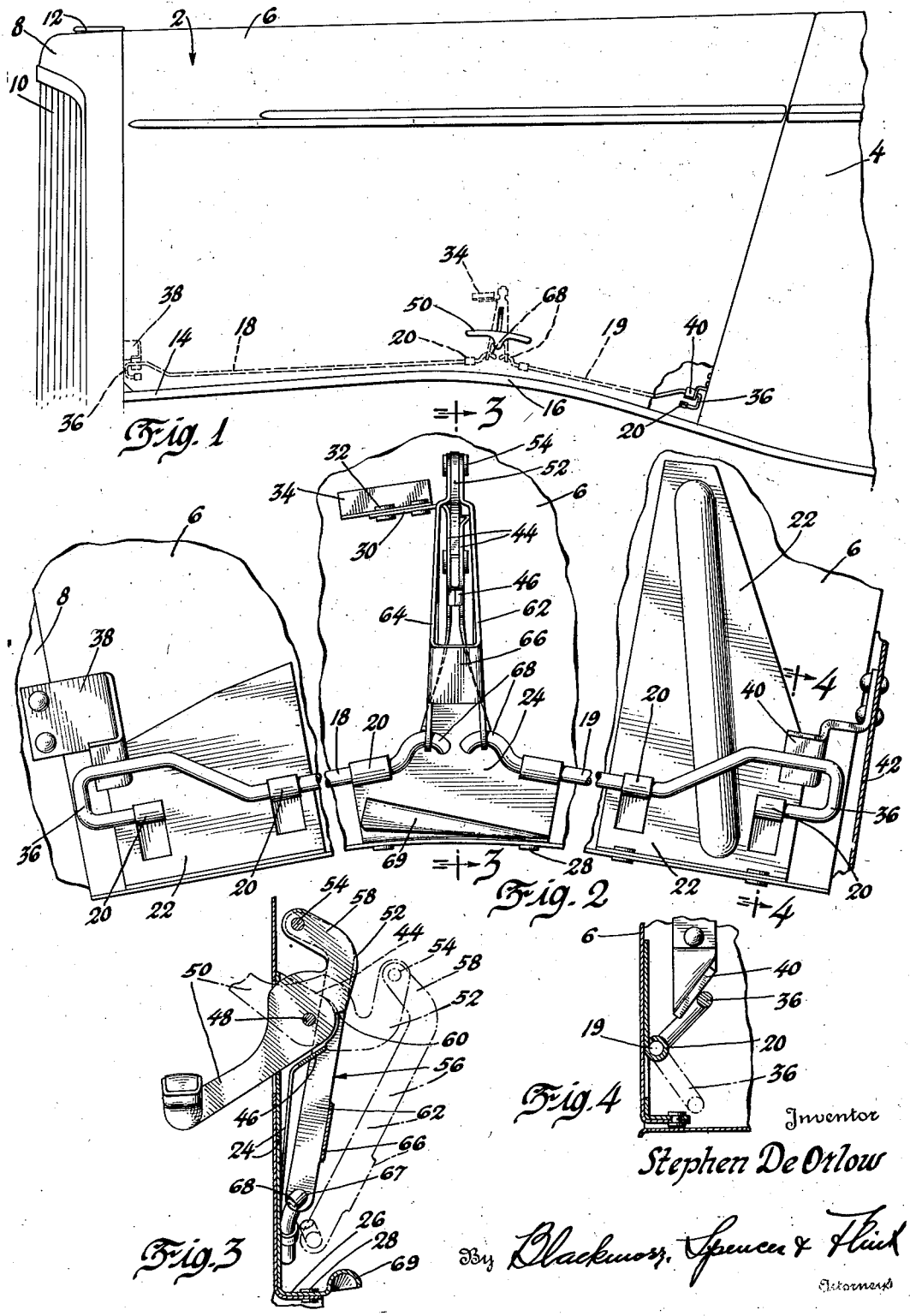
Inventor
Stephen De Orlow
By Blackmore, Spencer & Flint
Attorneys

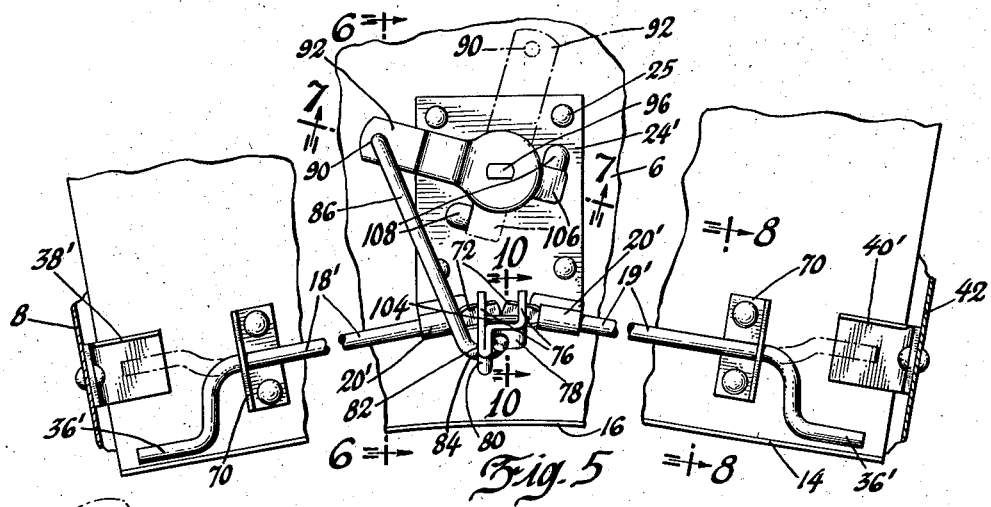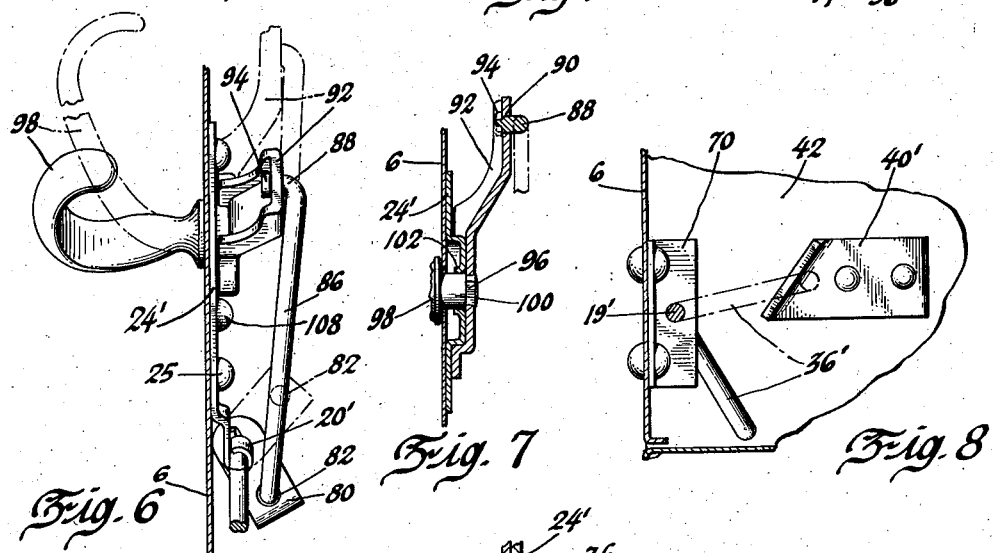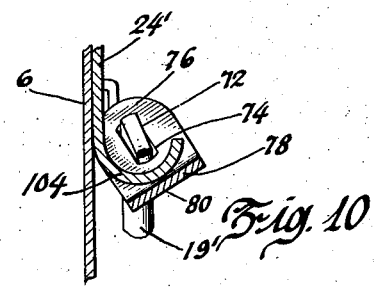

Patented Sept. 22, 1936

2,054,929

UNITED STATES PATENT OFFICE 2,054,929

HOOD LATCH

Stephen De Orlow, Detroit, Mich., assignor to Ternstedt Manufacturing Company, Detroit, Mich., a corporation of Michigan Application May 6, 1933, Serial No. 669,642

5 Claims. (Cl. 292—48)

This invention relates to latches for hoods of automotive vehicles and has particular reference to a hood latch which is operable by a single handle and adaptable to a vehicle having a hood cover the lower edge of which is curved or inclined.

In the past, automotive vehicles have had a hood the lower edge of which was straight or horizontally parallel. This structure has been due to the fact that there was a space between the fender or mud guard and the hood which formed a sort of ravine and made a straight edge possible. In modern automotive practice there is the tendency to fill up this ravine and make the fender so that it extends directly over to the hood from the topmost portion of the fender. This structure will necessitate a hood which has a lower edge which is curved or inclined. This modern structure occasions some difficulties where it is desired to employ a hood latch which comprises a single bar operable from the middle and having keeper engaging ends. The straight bar does not lend itself to adaptation to a hood having a curved lower edge.

It is the object of the present invention to construct a hood latch which will retain the advantages of the single locking bar and which will allow the keeper engaging members to be positioned closely adjacent the lower edge of the hood and yet having a single operating member which operates both hood latches from adjacent the middle point of the hood. The object of the invention is accomplished by using two bars which extend along the edge of the hood, one bar forming an angle with the other. At their meeting point the two bars are shaped to receive an operating member which is operable from a handle extending outside the hood.

On the drawings

Figure 1 shows a side view of an automotive vehicle and the hood thereof with the invention applied.

Figure 2 is an enlarged detail view of the hood latch looking from the inside of the hood.

Figure 3 is a section on the line 3—3 of Figure 2, the dotted line position being the unlatched position of the parts.

Figure 4 is a section on the line 4—4 of Figure 2 with the unlatched position shown in dotted lines.

Figure 5 is a view similar to Figure 2 of a modification, the dotted lines showing the latched position.

Figures 6, 7, 8, and 10 are sections on the corresponding lines of Figure 5, the dotted outline in Figures 6 and 8 showing the latched position.

Figure 9 is a perspective view of the link connecting the operating handle with the locking bars.

On the drawings the numeral 2 indicates an automotive vehicle as a whole. The vehicle has the usual cowl 4, hood 6, and radiator shell 8. The radiator grille is indicated at 10 and the filler cap at 12.

Instead of the usual construction the bottom or lower edge 14 of the hood is not straight but is curved intermediate its length as indicated at 16. Such a curved bottom to the hood is necessary where the mud guard is shaped to fill in the ravine ordinarily appearing in the automotive vehicles between the front mud guard and hood. From an examination of Figure 1 it will be apparent that were the usual straight bar hood latch to be used, one end of the latch would lock the hood a considerable distance above and away from the edge 14. To obviate this difficulty and to enable the terminals of the locking bars to latch the hood at the lower edge near the lateral edges, the usual single locking bar is replaced by the locking bars or rods 18 and 19. Both of these rods are journally mounted inside the hood by means of the eyes 20 formed in end brackets 22 and in the central mounting plate 24 which is secured to the inside of the hood by means of the flange 26 and rivets 28 at its bottom and by the tongue 30 secured by the rivets 32 to a bracket 34 at its top, the bracket 34 being secured to the hood 6 by spot welding.

The ends of the locking rods 18 and 19 are suitably formed or bent as indicated at 36 and are adapted to strike against the keepers 38 and 40, secured to the radiator shell 8 and to the dash 42, respectively.

The bracket 24 has the spaced ears 44 formed thereon and below the ears the lobes thereof are bent toward each other as indicated at 46 to form a shelf or stop the purpose of which will be later described. The ears are pierced for the reception of the pin or axle 48 which pivotally mounts the handle 50 between the ears. The handle has the angled extension finger 52 on the inside of the hood and pivoted as at 54 to the end of the handle is the operating link 56 the upper end of which is L-shaped as indicated at 58 to correspond to the shape of the finger 52. The handle 50 has a shoulder 60 which is adapted to strike against the shelf 46 when the handle is in raised position as indicated by the dotted lines in Figure 3.

The operating link 56 is best shown in Figures 2 and 3 and comprises the two spaced arms 62 and 64 united by the bridge 66. The lower ends of the arms 62 and 64 have openings 67 formed therein and in the openings there are received the curved or bent crank-arm ends 68 of the holding bars 18 and 19.

The bracket 24 is provided with an inclined arched footpiece 69 which is adapted to hold the hood in raised position by resting on the usual wishbone brace rod between the radiator and dash.

The operation of the hood latch is as follows: The full line position in Figures 2 and 3 shows the locked position of the parts. In this position it will be noted that the pivots 54, 48, and 67 are out of alignment, the pivots 54 being to the left of the line joining the pivots 48 and 68. This is the over center or locked position of the parts and in this position shaped ends 36 of the locking rods 18 and 19 are under tension, or sprung, and tightly held against the brackets 38 and 40. The ends 36 will strike the keepers 38 and 40 before the pivot 54 reaches its over center position.

To release the hood latch the handle 50 is raised, swinging the handle on the pivot 48 to throw the pivot 54 to the right (Figure 3) to bring the parts to the dotted line position. This movement of the handle will swing the cranked or bent ends 68 to swing the locking rods 18 and 19 to turn the bent ends 36 away from the brackets or to the dotted line position shown in Figure 4. This will release the catches from the brackets and allow the hood to be raised.

A second species of the invention is shown on Sheet 2 in Figures 5 to 10 inclusive. In this species the usual keepers or brackets 38' and 40' are provided secured to the radiator shell 8 and dash 42. The ends 36' of the locking bars or rods 18' and 19' are suitably bent for engagement with the keepers 38' and 40'. Suitable brackets 70 secured to the hood and having openings for the passage of the bars 18' and 19' serve journally to mount and to hold the shaped ends 36'. At their middle, or where the rods meet, they are journalled in the eyes 20' formed on the bottom of a bracket 24' secured by means of the rivets 25 to the hood. The eyes 20' are spaced from the hood 6 as shown in Figure 6.

At their meeting ends the rods 18' and 19' are flattened and twisted somewhat as indicated at 72. The twist is best seen in Figure 10. In order to operate the rods the flattened ends 72 are received in the rectangular openings 74 of the two arms 76 of an operating bracket 78, having an extending arm 80 integral therewith. The arm 80 has an eye 82 formed therein and in the eye there engages the hook end portion 84 of an operating link 86 the other end of which is bent as indicated at 88 and is received in an opening 90 in a crank arm 92 and turnably secured therein by pinching the end as indicated at 94. The crank arm 92 has rigidly secured thereto as at 96 the operating handle 98. The operating handle has a shaft or the like 100 journalled in the hood 6 and in a flanged opening 102 in a bracket 24'. By turning the handle 98 the crank arm 92 will be swung to operate the link 86 which in turn will swing the projection 80 to turn the holding rods 18' and 19'.

Figures 5 and 6 show in full lines the released position of the hood catch. In this position the hood may be raised for the reason that the ends 36' are free of engagement with the keepers 38' and 40'. In order to lock the hood the handle 98 is swung from the full line position to the dotted line position in Figure 6. This will swing the crank arm 92 from the full line position to the dotted line position in Figure 5. In the dotted line position in Figure 5 the pivoted end 88 of the link 86 will be over center with reference to the pivots at 96 and 82. This over center relation will rigidly hold the parts in position and will cause the ends 36' to be tensional or sprung against the brackets 38' and 40' tightly to hold the hood in place. To release the hood it is obvious that the parts are swung from the dotted line position in Figures 5 and 6 to the full line position.

In both of the species it will be noted that the rods 18 and 19, or 18' and 19' are at an angle to each other. This is made necessary by the curved edge 16 of the hood. In both species the hood is secured at its extreme corners because of the angular position of the locking bars.

Referring to Figure 10 it is to be noted that the bracket 24' is provided with an integral curved tongue 104 which projects into the bracket 78 between the arms 76. The tongue 104 is of a width to allow the bracket to turn freely but will prevent lateral movement thereof.

In Figure 5, the throw of the crank arm 92 is limited by the extension 106 engaging the stops 108.

I claim:

1. In a hood latch for hoods having a lower edge curved or at an angle to the horizontal, two bars adapted to be journally mounted at an angle to each other at the hood edge, said bars being straight between their mountings and extending away from each other and having one pair of ends juxtaposed, the other ends extending toward the hood ends and adapted to engage with keepers to hold the hood in down position, and means attached to the juxtaposed ends and adapted to be moved to operate both bars to release them from or engage them with their keepers.

2. In a hood latch for hoods having a lower edge curved or at an angle to the horizontal, two bars adapted to be journally mounted at an angle to each other at the hood edge, said bars being straight between their mountings and extending away from each other and having one pair of ends curved and juxtaposed, the other ends extending toward the hood ends and adapted to engage with keepers to hold the hood in down position, and means attached to the curved ends and adapted to be moved to operate both bars to release them from or engage them with their keepers.

3. In a hood latch for hoods having a lower edge curved or at an angle to the horizontal, two bars adapted to be journally mounted at an angle to each other at the hood edge, said bars being straight between their mountings and extending away from each other and having one pair of ends juxtaposed, said juxtaposed ends being bent to form cranks, the other ends extending toward the hood ends and adapted to engage with keepers to hold the hood in down position, and means attached to the cranks and adapted to be moved to operate both rods to release them from or engage them with their keepers.

4. In a hood latch for hoods having a lower edge curved or at an angle to the horizontal, two bars adapted to be journally mounted at an angle to each other in the hood edge, said bars being straight between their mountings and extending away from each other and having one pair of ends juxtaposed, said ends being flattened, the other ends extending toward the hood ends and adapted to engage with keepers to hold the hood in down position, and means connected with the flattened ends and adapted to be moved to operate both rods to release them from or engage them with their keepers.

5. In a hood latch for hoods having a lower edge curved or at an angle to the horizontal, a plurality of bars adapted to be journally mounted at an angle to each other at the hood edge, said bars being straight between their mountings and extending away from each other and having one pair of ends juxtaposed, the other ends extending toward the hood ends and adapted to engage with keepers to hold the hood in down position, common means attached to the juxtaposed ends and adapted to be moved to operate the other ends to release them from or engage them with their keepers, and means extending without the hood to operate said means.

STEPHEN DE ORLOW.